Patented June 3, 1947

2,421,409

UNITED STATES PATENT OFFICE 2,421,409

THERMOPLASTIC POLYVINYL CHLORIDE, CHLORINATED PARAFFIN WAX, PLASTICIZER COMPOSITIONS

Ernest Francis Brookman and Stephen Frederick Pearce, Welwyn Garden City, England, assignors to Imperial Chemical Industries Limited, a corporation of Great Britain No Drawing. Application April 1, 1943, Serial No. 481,498. In Great Britain April 3, 1942

6 Claims. (Cl. 260—28)

This invention relates to improved thermoplastic compositions and to shaped articles manufactured from such compositions. More particularly it relates to such compositions and articles based upon polyvinyl halides.

Polyvinyl halides and, in particular, polyvinyl chloride have recently been much proposed and much used as a basis for thermoplastic compositions, and when used in this manner it has been found desirable for most purposes to introduce into the polyvinyl chloride a proportion of one or more plasticisers so as to lower the plastic temperature range to a point where thermal decomposition of the polyvinyl halide is substantially avoided. Whilst the introduction of such plasticisers has materially increased the usefulness of the polyvinyl halides, the plasticised compositions referred to above have nevertheless suffered from disadvantages, the most serious of which have been difficulty of extrusion, poor surface finish in the shaped article, and frequently, poor electrical properties, particularly power-factor and volume resistivity.

We have now found that novel thermoplastic compositions which can be readily extruded and which give shaped articles of excellent surface finish and of improved power-factor and volume resistivity comprise one or more vinyl halide polymers in substantially homogeneous admixture with one or more plasticisers and with chlorinated paraffin wax containing 35–55% chlorine, the proportion of chlorinated wax being 1–65% calculated on the combined weights of the chlorinated wax and plasticisers and the proportion of polymer in the composition being at least 40% but less than 70% by weight.

By the term "vinyl halide polymer" we mean polyvinyl chloride, bromide or iodide or interpolymers of these vinyl halides with vinyl acetate, methyl acrylate, methyl methacrylate, methyl alpha-chloracrylate, styrene or vinylidene chloride, the interpolymer being derived from a mixture which contains not more than 20% by weight of the non-vinyl halide ingredient.

As plasticisers we may use any of the substances known as plasticisers for polyvinyl chloride. In particular we use esters of phthalic acid, e. g. dibutyl phthalate, and aromatic tri-esters of phosphoric acid, e. g., tricresyl phosphate. The chlorinated paraffin wax may be one or more of any of the known commercial materials, provided that its chlorine content is 35–55% by weight, although we preferably use a chlorinated wax containing 40–50% chlorine by weight.

Our novel composition may be produced by mixing the ingredients by any of the known methods for producing polyvinyl chloride extrusion compositions, e. g., by milling on hot rolls, or in a Bridge Banbury type of mixer.

Preferably, the chlorinated wax is dissolved in the other plasticiser or plasticisers, thoroughly premixed with the polymer or polymers at room temperature and the resultant mixture homogenised on hot rolls.

Our invention is illustrated but in no way limited by the following examples in which all parts given are by weight.

Example 1

The following compositions were prepared by pre-mixing the ingredients at room temperature and subsequently completing the mixing on heated rolls at about 130° C. Composition A is illustrative of the invention whilst composition B is formulated in accordance with the prior art.

(A)

| | Parts |
|---|---|
| Polyvinyl chloride | 100 |
| Dibutyl phthalate | 25 |
| Chlorinated paraffin wax (containing 47% Cl by weight) | 25 |
| Stabiliser and pigment | 8.5 |

(B)

| | Parts |
|---|---|
| Polyvinyl chloride | 100 |
| Dibutyl phthalate | 50 |
| Stabiliser and pigment | 8.5 |

The stabiliser and pigment employed were identical both in nature and in relative proportion in the two compositions. The properties of the two compositions were as set out below.

| | Composition A | Composition B |
|---|---|---|
| Rate of Extrusion | Very high | High. |
| Tensile strength (lbs./in.²) | 3500–4000 | 2500. |
| % elongation at break | 150–175 | 130–140. |
| Water-absorption (8 hrs. at 70° C.) | 0.30–0.33 | 0.40. |
| Volume Resistivity (ohms/cm.³) | $1.5 \times 10^{13}$ | $2.7 \times 10^{11}$. |
| Specific Inductive Capacity (50 cycles) | 6.56 | 8.56. |
| Specific Inductive Capacity (800 cycles) | 5.38 | 7.10. |
| Power Factor (tan) (50 cycles) | 0.114 | 0.103. |
| Power Factor (tan) (800 cycles) | 0.089 | 0.151. |

Example 2

| | Parts |
|---|---|
| A 95/5 vinyl chloride/vinyl acetate interpolymer | 100 |
| Dibutyl phthalate | 30 |
| Chlorinated paraffin wax (chlorine content 42%) | 30 |
| Stabiliser, filler and pigment | 8.5 | were mixed as in Example 1. The composition produced had excellent extrusion properties, a tensile strength of 2500 lbs./sq. in. a volume resistivity of $2 \times 10^{12}$ ohm/cm.³, a specific inductive capacity, measured at 50 cycles and 1000 volts, of 7.6 and a power factor (tan), measured at 50 cycles and 1000 volts, of 0.103. The composition was flexible at −25° C.

Example 3

| | Parts |
|---|---|
| Polyvinyl chloride | 100 |
| Dibutyl phthalate | 40 |
| Chlorinated paraffin wax (chlorine content 42%) | 40 |
| Stabiliser, filler and pigment | 8.5 | were mixed as in Example 1.

The composition produced had excellent extrusion properties, a tensile strength of 1600 lbs./sq. in. a volume resistivity of $7.5 \times 10^{11}$ ohm/cm$^3$., a specific inductive capacity, measured at 50 cycles and 1000 volts, of 8.4 and a power factor (tan), measured at 50 cycles and 1000 volts, of 0.69. The composition was flexible at −35° C.

Example 4

| | Parts |
|---|---|
| Polyvinyl chloride | 100 |
| Tricresyl phosphate | 25 |
| Chlorinated paraffin wax (42% chlorine) | 25 |
| Stabiliser, filler and pigment | 8.5 | were mixed as in Example 1.

The composition had excellent extrusion properties, a tensile strength of 3000 lbs./sq. in. and a volume resistivity of $1 \times 10^{13}$ ohm/cm.$^3$. It was flexible at −15° C.

In all the above examples the chlorinated wax was dissolved in the dibutyl phthalate or tricresyl phosphate before being mixed with the other ingredients.

Any of the customary pigments, fillers and stabilisers may be incorporated in our newly proposed compositions, and compositions containing such bodies are within the scope of our invention, it being understood that where pigments, fillers, stabilisers or the like are incorporated, the relative proportions of polymer, plasticiser and chlorinated wax are defined in the manner already set out without reference to the weights of other ingredients present.

Having now particularly described and ascertained the nature of our said invention and in what manner the same is to be performed, we declare that what we claim is:

1. A vinyl halide polymer composition which can be readily shaped by extrusion to produce articles of improved power factor and volume resistivity comprising vinyl halide polymer in substantially homogeneous admixture with a plasticizer and a chlorinated paraffin wax containing 35–55% by weight of chlorine, the proportion of said wax being 1–65% of the combined weights of said wax and said plasticizer, said composition containing at least 40% but less than 70% by weight of said polymer.

2. A vinyl halide polymer composition which can be readily shaped by extrusion to produce articles of improved power factor and volume resistivity comprising vinyl halide polymer in substantially homogeneous admixture with dibutyl phthalate and a chlorinated paraffin wax containing 40–50% by weight of chlorine, the proportion of said wax being 1–65% of the combined weights of said wax and said phthalate, said composition containing at least 40% but less than 70% by weight of said polymer.

3. A vinyl halide polymer composition which can be readily shaped by extrusion to produce articles of improved power factor and volume resistivity comprising polyvinyl chloride in substantially homogeneous admixture with dibutyl phthalate and a chlorinated paraffin wax containing 40–50% by weight of chlorine, the proportion of said wax being 1–65% of the combined weights of said wax and said phthalate, said composition containing at least 40% but less than 70% by weight of said polymer.

4. A vinyl halide polymer composition which can be readily shaped by extrusion to produce articles of improved power factor and volume resistivity comprising vinyl halide polymer in substantially homogeneous admixture with tricresyl phosphate and a chlorinated paraffin wax containing 40–50% by weight of chlorine, the proportion of said wax being 1–65% of the combined weights of said wax and said phosphate, said composition containing at least 40% but less than 70% by weight of said polymer.

5. A vinyl halide polymer composition which can be readily shaped by extrusion to produce articles of improved power factor and volume resistivity comprising polyvinyl chloride in substantially homogeneous admixture with tricresyl phosphate and a chlorinated paraffin wax containing 40–50% by weight of chlorine, the proportion of said wax being 1–65% of the combined weights of said wax and said phosphate, said composition containing at least 40% but less than 70% by weight of said polymer.

6. A composition as claimed in claim 1 containing vinyl halide polymer which is an interpolymer of a vinyl halide with not more than 20% by weight of a polymerisable material selected from the group consisting of vinyl acetate, methyl acrylate, methyl methacrylate, methyl alpha-chloracrylate, styrene and vinylidene chloride.

ERNEST FRANCIS BROOKMAN.
STEPHEN FREDERICK PEARCE.

REFERENCES CITED

The following references are of record in the file of this patent:

UNITED STATES PATENTS

| Number | Name | Date |
|---|---|---|
| 2,111,395 | Hartwick | Mar. 15, 1938 |
| 2,252,485 | Hull | Aug. 12, 1941 |
| 2,174,164 | Pellerano | Sept. 26, 1939 |
| 2,307,057 | Mitchell | Jan. 5, 1943 |
| 1,932,889 | Groff | Oct. 31, 1933 |

FOREIGN PATENTS

| Number | Country | Date |
|---|---|---|
| 654,118 | Germany | Dec. 10, 1937 |
| 669,385 | Germany | Dec. 28, 1938 |

OTHER REFERENCES

Carbide and Carbon Chemicals Corporation, "Vinylite Copolymer Resins for Surface Coating," 1942, table 3. (Copy in Division 50.)

Carbide and Carbon Chemicals Corporation, "Vinylite Copolymer Resins for Surface Coating," 1942, page 26. (Copy in Division 50.)

Carbide and Carbon Chemicals Corporation, "Vinylite Copolymer Resins for Surface Coating," 1942, pp. 1 and 27. (Received by Division 50 February 1, 1943.)

Plastics, 1943, Catalog, copyright 1942. Received by United States Patent Office Library February 25, 1943, published by Plastics Catalogue Corporation, New York, N. Y., page 258. (Copy in Division 50.)